United States Patent
Kamiya et al.

(10) Patent No.: US 11,518,374 B2
(45) Date of Patent: Dec. 6, 2022

(54) VEHICLE BRAKING SUPPORT DEVICE AND BRAKING SUPPORT CONTROL METHOD

(71) Applicants: DENSO CORPORATION, Kariya (JP); TOYOTA JIDOSHA KABUSHIKI KAISHA, Toyota (JP)

(72) Inventors: Kei Kamiya, Kariya (JP); Yosuke Ito, Kariya (JP); Takaharu Oguri, Kariya (JP); Takahiro Baba, Kariya (JP); Ryo Takaki, Kariya (JP); Shinichi Nagata, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 92 days.

(21) Appl. No.: 16/869,531

(22) Filed: May 7, 2020

(65) Prior Publication Data

US 2020/0262422 A1 Aug. 20, 2020

Related U.S. Application Data

(63) Continuation of application No. PCT/JP2018/036724, filed on Oct. 1, 2018.

(30) Foreign Application Priority Data

Nov. 8, 2017 (JP) .............................. JP2017-215148

(51) Int. Cl.
*B60W 30/09* (2012.01)
*B60W 30/18* (2012.01)
(Continued)

(52) U.S. Cl.
CPC ............ *B60W 30/09* (2013.01); *B60W 10/18* (2013.01); *B60W 30/0956* (2013.01); *B60W 30/18159* (2020.02); *B60W 2554/4049* (2020.02)

(58) Field of Classification Search
CPC ... B60R 21/0134; B60W 10/18; B60W 30/09; B60W 30/18154; B60W 30/18159; B60W 2520/04; B60W 2710/18; G08G 1/16
See application file for complete search history.

(56) References Cited

U.S. PATENT DOCUMENTS

2003/0135318 A1* 7/2003 Tellis .................... B60W 30/16
701/96
2006/0052926 A1* 3/2006 Okada .................. B60W 30/17
701/51
(Continued)

FOREIGN PATENT DOCUMENTS

JP 2010-280271 A 12/2010

*Primary Examiner* — Anshul Sood
(74) *Attorney, Agent, or Firm* — Maschoff Brennan

(57) ABSTRACT

Provided is a vehicle braking support device. The braking support device includes: detection units for detecting a state around a host vehicle; a braking support control unit for executing braking support by a braking device according to the detected state; and a vehicle stop control unit for maintaining a stopped state of a host vehicle after the host vehicle is stopped by the braking support control unit, and for releasing the stopped state of the host vehicle after a predetermined period has elapsed. The vehicle stop control unit, in a case where by using the detected state it is determined that it is desirable to maintain the stopped state of the host vehicle beyond the predetermined period, the vehicle stop control unit does not release the stopped state of the host vehicle until an operation by a driver is detected.

8 Claims, 5 Drawing Sheets

(51) Int. Cl.
*B60W 10/18* (2012.01)
*B60W 30/095* (2012.01)

(56) References Cited

U.S. PATENT DOCUMENTS

| | | | |
|---|---|---|---|
| 2010/0286887 A1* | 11/2010 | Maruyama | B60W 10/184 701/96 |
| 2011/0039658 A1* | 2/2011 | Sokoll | B60T 7/14 477/195 |
| 2013/0282252 A1* | 10/2013 | Takagi | G08G 1/165 701/70 |
| 2017/0361841 A1* | 12/2017 | Kojo | B60W 30/0956 |
| 2019/0070957 A1* | 3/2019 | Nakatsuka | B60K 28/06 |

* cited by examiner

VEHICLE BRAKING SUPPORT DEVICE AND BRAKING SUPPORT CONTROL METHOD

CROSS-REFERENCE TO RELATED APPLICATION

This application is the U.S. bypass application of International Application No. PCT/JP2018/036724 filed Oct. 1, 2018 which designated the U.S. and claims priority to Japanese Patent Application No. 2017-215148, filed Nov. 8, 2017, the contents of which are incorporated herein by reference.

BACKGROUND

Technical Field

The present disclosure relates to a vehicle braking support device and a braking support control method.

An obstacle avoidance technique for avoiding a collision with a target object such as another vehicle or an obstacle existing in front of the host vehicle using a detection result from an object detector such as a camera or a radar has been put to practical use. The obstacle avoidance technique also includes a braking support technique for performing braking support of a vehicle using a detection result.

SUMMARY

The technique according to the present disclosure may be achieved in the following aspect.

One aspect of the present disclosure provides a vehicle braking support device. A braking support device for a vehicle according to a first aspect includes a braking support control unit for executing braking support by a braking device; and a vehicle stop control unit for maintaining a stopped state of a host vehicle after the host vehicle is stopped by the braking support control unit and for releasing the stopped state of the host vehicle after a predetermined period has elapsed.

DETAILED DESCRIPTION OF THE PREFERRED EMBODIMENTS

As a conventional example of a braking support technique, it is disclosed that a braking support for stopping the host vehicle is executed when identifying a traffic signal color or a stop line, or braking support for stopping the host vehicle is executed in a case where it is determined that collision with a target object is unavoidable by only deceleration. Stopping a host vehicle by braking support is not the stopping of a vehicle based on the intention of the driver, so there are cases in which the driver may not be operating the brake pedal, and there is a possibility that when application of the brake fluid pressure to the braking device is immediately released after the vehicle stops, the vehicle may start moving. Therefore, a technique for maintaining the application of brake fluid pressure to the braking device for a predetermined period after the vehicle is stopped by braking support; or in other words, a technique for maintaining the stopped state of the vehicle has been proposed.

However, depending on the environment of the road on which the host vehicle is stopped, there are cases in which it may not always be desirable to release the application of the brake fluid pressure to the braking device after the elapse of a predetermined period, and there are also cases in which it may be desirable to release the application of the brake fluid pressure to the braking device after the elapse of a predetermined time period.

Therefore, depending on the surrounding conditions of the host vehicle, it may be desirable to execute maintenance of the stopped state of the vehicle after the vehicle is stopped by braking support, or it may be desirable to execute the release of maintenance of the stopped state.

Hereinafter, embodiments of the present disclosure will be described with reference to the drawings.

A vehicle braking support device and a vehicle braking support control method according to the present disclosure will be described below based on some embodiments.

First Embodiment

Figure 1:
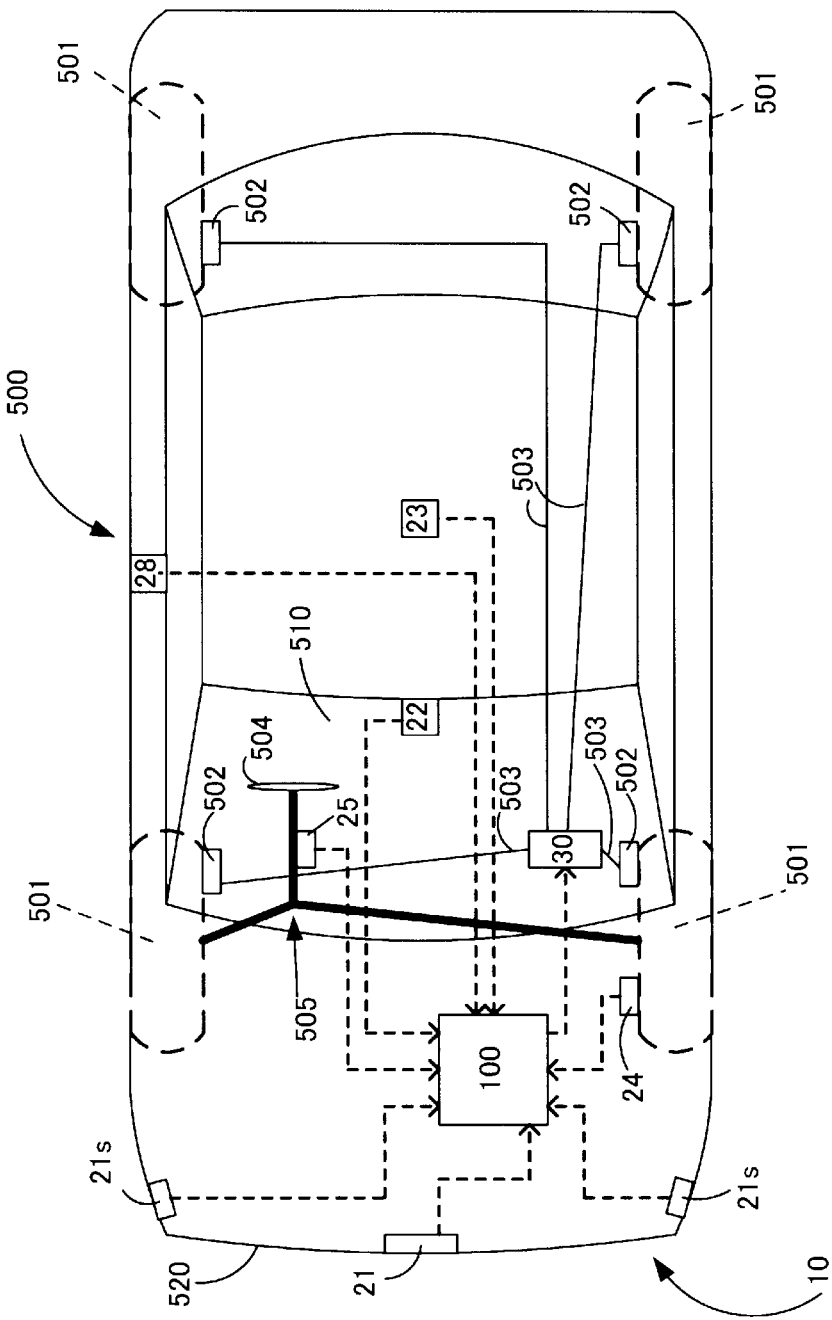
FIG. 1 is an explanatory diagram illustrating a vehicle equipped with a braking support device according to a first embodiment.

As illustrated in FIG. 1, a braking support device 10 according to a first embodiment is used by being mounted in a vehicle 500. The braking support device 10 may include at least a control device 100, and may further include millimeter-wave radars 21, 21s, a monocular camera 22, a yaw rate sensor 23, a wheel speed sensor 24, a steering angle sensor 25, a door sensor 28, and a braking support actuator 30. The vehicle 500 includes wheels 501, a braking device 502, a brake line 503, a steering wheel 504, a windshield 510, and a front bumper 520. Note that of the millimeter wave radars 21, 21s, the monocular camera 22, and a LIDAR (laser radar), the vehicle may include at least the monocular camera 22 as a detecting unit for detecting a state around the host vehicle; and in this embodiment, the millimeter-wave radars 21, 21s and the monocular camera 22 are provided as detecting units. In the present embodiment, the surrounding state of the host vehicle is a state including: a road environment such as an intersection, a traffic signal, a road sign, and a road shape; and a traveling state of another vehicle.

In the vehicle 500, a braking device 502 is provided for each wheel 501. Each braking device 502 achieves braking of each wheel 501 by a brake fluid pressure supplied via a brake line 503 in response to operation of a brake pedal by the driver. The brake line 503 includes a brake piston and a brake fluid line for generating a brake fluid pressure according to the operation of the brake pedal. In the present embodiment, the braking support actuator 30 is provided on the brake line 503, and the hydraulic pressure control that is independent of the operation of the brake pedal is possible, whereby the braking support is achieved. Note that, instead of a brake fluid line, the brake line 503 may be a control signal line, and a configuration for operating an actuator provided in each braking device 502, or brake-by-wire may be employed. The steering wheel 504 is connected to the front wheels 501 via a steering mechanism 505 including a steering rod.

Figure 2:
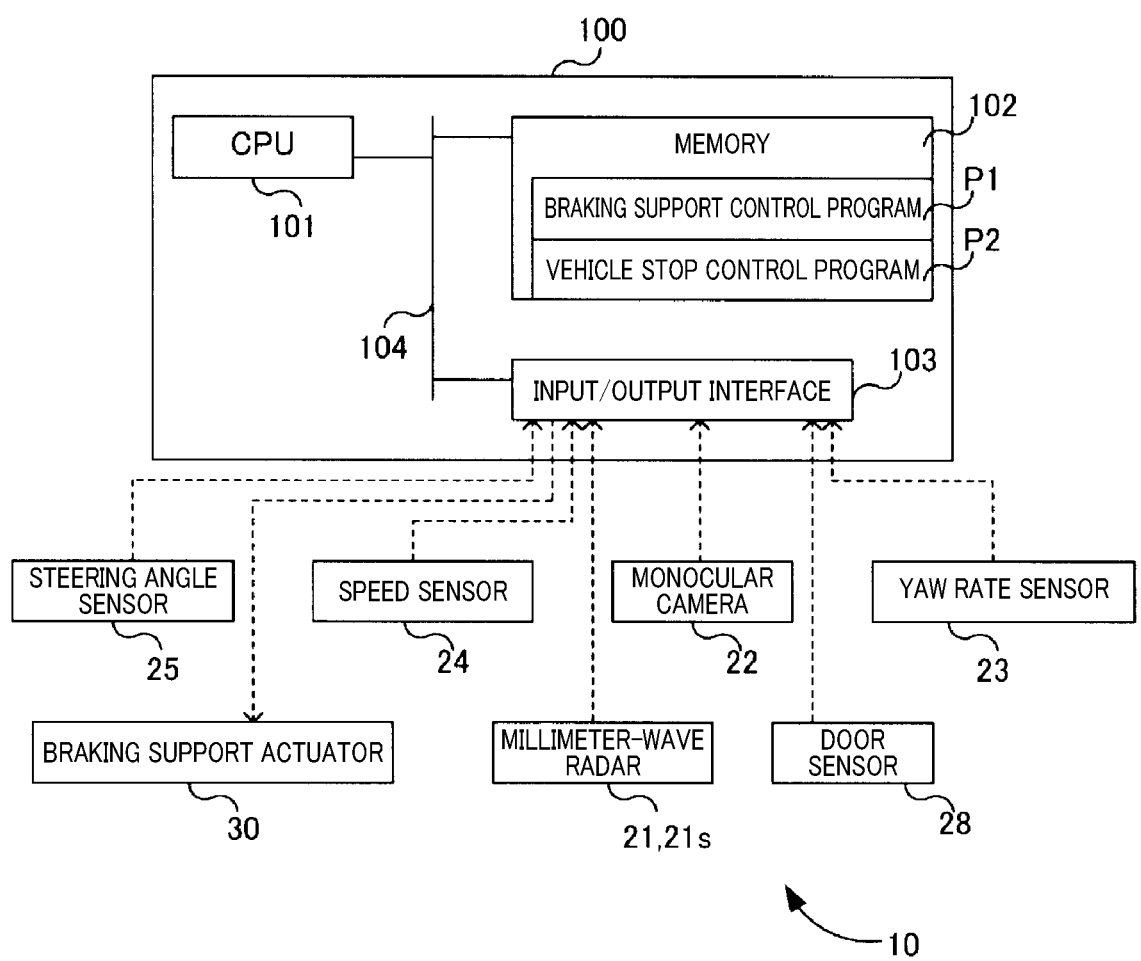
FIG. 2 is a block diagram illustrating a functional configuration of a control device provided in the braking support device according to a first embodiment.

As illustrated in FIG. 2, the control device 100 includes a central processing unit (CPU) 101, a memory 102, an input/output interface 103, and a bus 104. The CPU 101, the memory 102, and the input/output interface 103 are connected via a bus so that bidirectional communication is possible. The memory 102 includes: a non-volatile, read only memory, for example a ROM, for storing a braking support control program P1 for executing braking support by the braking device 502, and a vehicle stop control program P2 for maintaining a stopped state of a vehicle after the vehicle has been stopped by braking support; and a memory that is readable and writable by the CPU 101, for example, a RAM. The CPU 101 functions as a braking support control unit by expanding and executing the braking support control program P1 stored in the memory 102 in a readable/writable memory, and functions as a vehicle stop control unit by executing the vehicle stop control program P2. Note that the braking support control unit may include the braking support actuator 30 that receives a control signal from the CPU 101 and applies brake fluid pressure to the brake line 503 for braking support. In addition, the braking support control unit may be classified into the CPU 101 as a control unit that executes the braking support control program P1 for controlling execution of braking support and transmits a control signal to each actuator, and the braking support actuator 30 as a drive unit that drives the braking device 502 for braking support. The vehicle stop control unit may include the braking support actuator 30 in addition to the CPU 101, or may be classified into the CPU 101 as a control unit that executes a vehicle stop control program P2 for maintaining the stopped state of the vehicle and transmits a control signal to each actuator, and the braking support actuator 30 as a drive unit that drives the braking device 502. The CPU 101 may be a single CPU, a plurality of CPUs for executing each program, or a multi-thread type CPU capable of simultaneously executing a plurality of programs.

The input/output interface 103 is connected to the millimeter-wave radars 21, 21s, the monocular camera 22, the yaw rate sensor 23, the wheel speed sensor 24, the steering angle sensor 25, the door sensor 28, and the braking support actuator 30 via respective control signal lines. Detection information is inputted from the millimeter-wave radars 21, 21s, the monocular camera 22, the yaw rate sensor 23, the wheel speed sensor 24, the steering angle sensor 25, and the door sensor 28, and a control signal indicating a braking level is outputted to the braking support actuator 30.

The millimeter-wave radars 21, 21s are sensors that detect the distance, relative speed, and angle of a target object by emitting millimeter waves and receiving reflected waves that are reflected by the target object. In the present embodiment, a millimeter-wave radar 21 is arranged at the center of the front bumper 520, and two millimeter-wave radars 21s are arranged on both side surfaces of the front bumper 520, respectively. The detection signals that are outputted from the millimeter-wave radars 21, 21s may be, for example, a signal including a point or a series of points indicating one or more representative positions of a target object on which the received wave has been processed in the processing circuits included in the millimeter wave radars 21, 21s, or may be a signal indicating an unprocessed received wave. In a case where an unprocessed received wave is used as the detection signal, the control device 100 executes signal processing for specifying the position and distance of the target object. Note that LIDAR may be used instead of a millimeter-wave radar.

The monocular camera 22 is an image pickup device that includes one image pickup element such as a CCD or the like, and is a sensor that receives visible light and outputs external shape information of a target object as image data that is the detection result. The image data that is outputted from the monocular camera 22 includes a plurality of frame images that are continuous in a time series, and each frame image is represented by pixel data. In the present embodiment, the monocular camera 22 is arranged at the center of the upper part of the windshield 510. The pixel data that is outputted from the monocular camera 22 is monochrome pixel data or color pixel data. Note that a compound-eye stereo camera may be used instead of the monocular camera 22.

The yaw rate sensor 23 is a sensor that detects the turning angle velocity of the vehicle 500. The yaw rate sensor 23 is arranged, for example, at the center of the vehicle. The detection signal that is outputted from the yaw rate sensor 23 is a voltage value that is proportional to the turning direction and the angular velocity.

The wheel speed sensor 24 is a sensor that detects the rotation speed of a wheel 501, and one is provided for each wheel 501. The detection signal that is outputted from the wheel speed sensor 24 is a voltage value proportional to the wheel speed or a pulse wave indicating an interval corresponding to the wheel speed. By using the detection signal from the wheel speed sensor 24, information such as the vehicle speed, traveling distance of the vehicle and the like may be obtained.

The steering angle sensor 25 is a torque sensor that detects the amount of torsion, or in other words, the steering torque generated in the steering rod by steering of the steering wheel 504. In the present embodiment, the steering angle sensor 25 is provided on a steering rod that connects the steering wheel 504 and the steering mechanism. The detection signal that is outputted from the steering angle sensor 25 is a voltage value proportional to the amount of torsion.

The door sensor 28 is a sensor for detecting whether the doors of the vehicle 500, in particular, the door on the driver's side, is in a closed state. In other words, the door sensor 28 is a sensor for detecting whether a door is completely closed, including a state in which the door is half-closed.

The braking support actuator 30 is an actuator for achieving braking by the braking device 502 irrespective of operation of the brake pedal by the driver. A driver for controlling the operation of the actuator based on a control signal from the CPU 101 is mounted on the braking support actuator 30. In the present embodiment, the braking support actuator 30 is provided in the brake line 503, and increases or decreases the brake fluid pressure in the brake line 503 according to a control signal from the control device 100. The braking support actuator 30 is formed, for example, of a module that includes an electric motor and a brake fluid pressure piston that is driven by the electric motor. Alternatively, a braking control actuator already introduced as an anti-skid device or an anti-lock brake system may be used.

Figure 3:
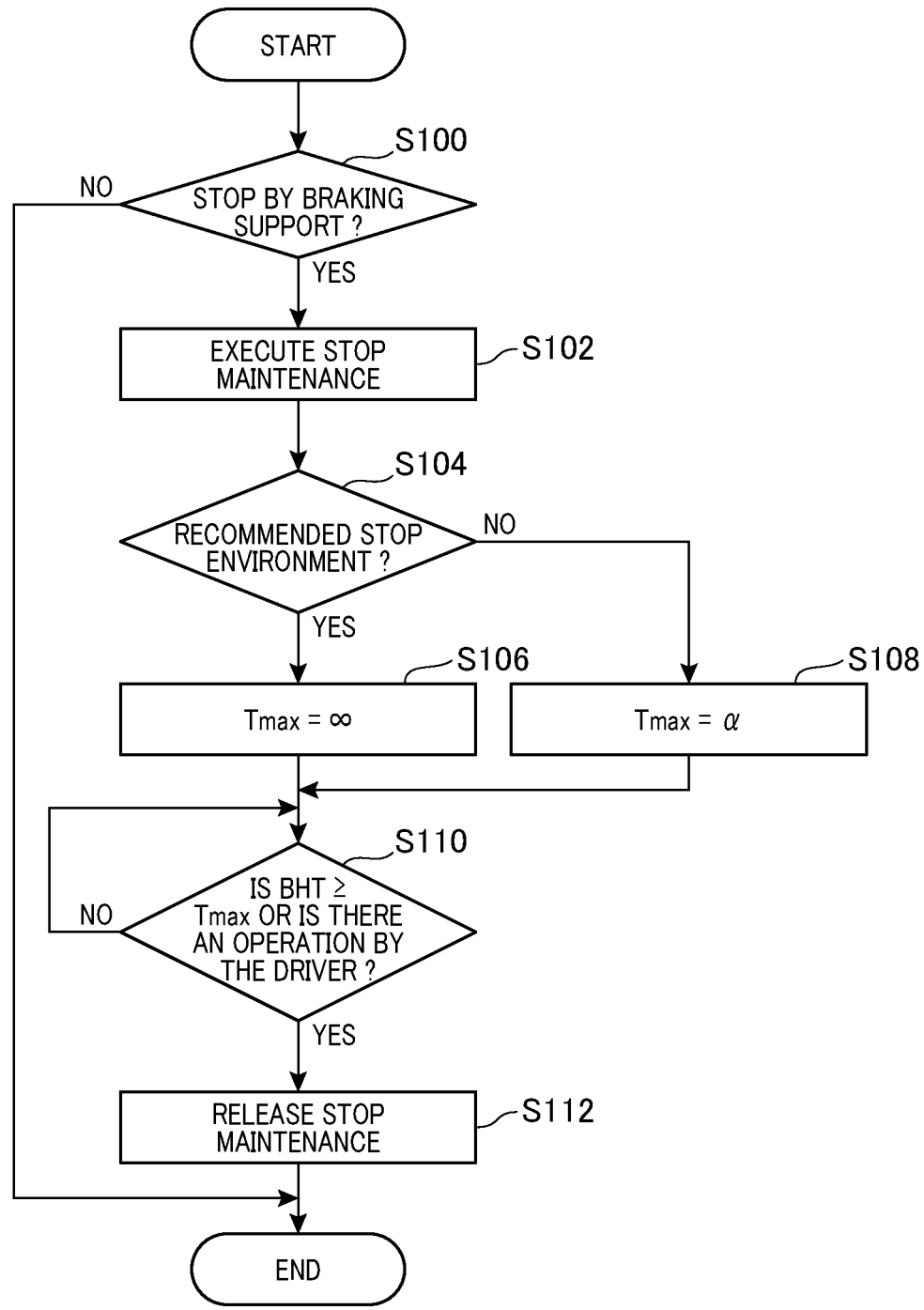
FIG. 3 is a flowchart illustrating a processing flow of vehicle stop maintenance control executed by the braking support device according to a first embodiment.

A vehicle stop control process executed by the braking support device 10 according to the first embodiment will be described with reference to FIG. 3 to FIG. 6. The CPU 101 executes the vehicle stop control program P2 whereby, the processing routine illustrated in FIG. 3 is repeatedly executed during a specified time interval; for example, from the start to the stop of the vehicle control system, or from when the start switch is turned ON until the start switch is turned OFF. Alternatively, execution of the processing routine illustrated in FIG. 3 may be started with a stop caused by braking of the vehicle 500 as a trigger. This will be described below by taking the situation illustrated in FIG. 4 as an example.

Figure 4:
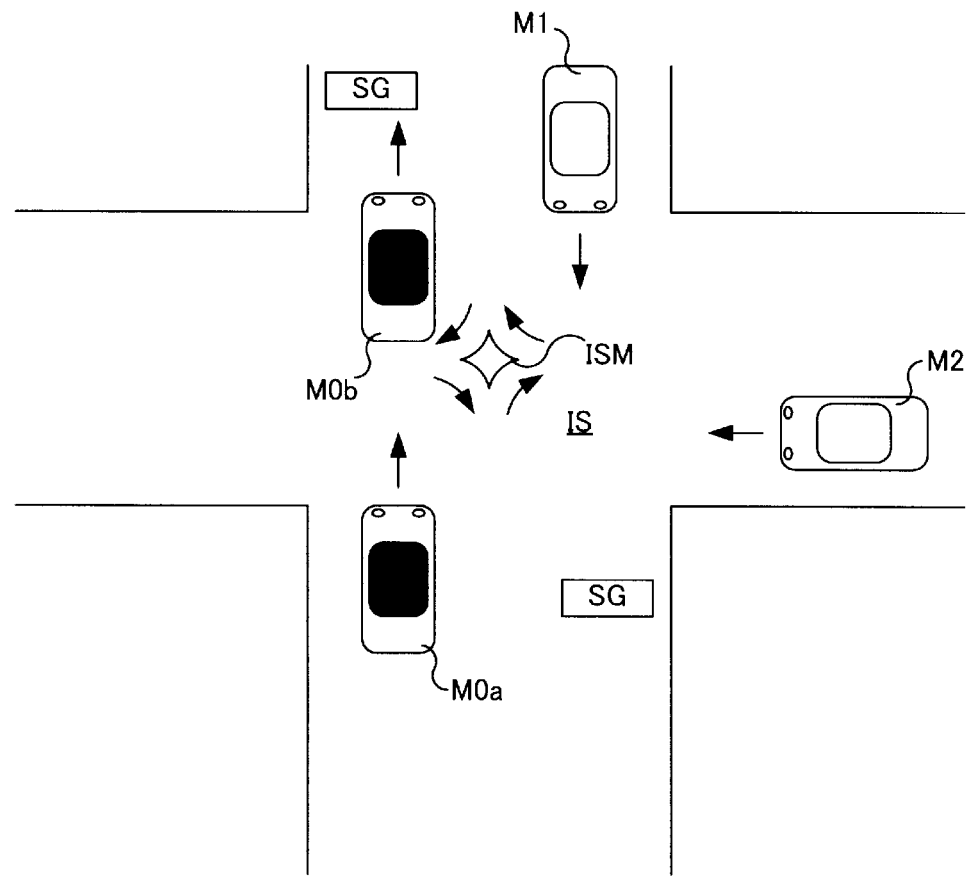
FIG. 4 is an explanatory diagram schematically illustrating an example of the position of the host vehicle when a vehicle stop control process is executed in a first embodiment.

When the vehicle control system is started, the CPU 101 starts executing the braking support control program P1. In the present embodiment, the braking support control program P1 may be executed for avoiding and reducing contact with and collision with other vehicles, or may be executed for observing traffic rules at the time of autonomous driving according to the traveling state or traveling route of the host vehicle. The braking support control program P1, in a situation approaching an intersection IS as illustrated in FIG. 4, for example, uses lighting information of a traffic signal SG detected via the monocular camera 22, and intersection markings ISM or stop line information (not illustrated) on the road to determine whether or not the host vehicle M0a is about to enter the intersection IS; and in a case of a situation that requires a stop using light information or stop line information, stops the host vehicle M0a by performing braking support. Alternatively, in a case where the presence of a crossing vehicle M2 that is crossing the direction of travel of the host vehicle M0a is detected by using the detection results from the millimeter-wave radars 21, 21s, the host vehicle M0a is stopped by executing braking support before the host vehicle M0a enters the intersection IS. In other words, even in a case of an intersection where a traffic signal SG is not installed, or in a case where the traffic signal SG is not recognizable by the monocular camera 22, it is possible to perform braking support when entering the intersection IS. Furthermore, depending on the attributes of an oncoming vehicle M1 facing the host vehicle M0a, the CPU 101 also performs braking support within the intersection IS in order to avoid a frontal collision or an offset collision, and, for example, the host vehicle M0b stops within the intersection IS. In the present embodiment, the oncoming vehicle M1 means a traveling vehicle that faces the host vehicles M0a and M0b. Attributes include, for example, the distance from the host vehicles M0a, M0b to the oncoming vehicle M1, the relative speed of the oncoming vehicle M1 with respect to the host vehicles M0a, M0b, the direction of the oncoming vehicle M1, the lap rate between the host vehicles M0a, M0b and the oncoming vehicle M1, and the estimated time to collision (TTC) before colliding with the oncoming vehicle M1. These attributes are calculated and acquired using the detection results detected by the monocular camera 22, and the millimeter-wave radars 21, 21s. The CPU 101 also uses the image data from the monocular camera 22 to calculate and acquire, for example, the external dimensions of the oncoming vehicle M1 and the lateral position of the oncoming vehicle M1 with respect to the host vehicles M0a, M0b as attributes. Note that the accuracy of determining the direction of the oncoming vehicle M1 and the lap rate between the host vehicles M0a, M0b and the oncoming vehicle M1 may be improved by executing a data fusion process using the detection results from the millimeter-wave radars 21, 21s and the image data from the monocular camera 22. The lap rate means a ratio of overlap in the width direction, or in other words, the horizontal direction of the host vehicles M0a, M0b and the oncoming vehicle M1. Note that in the following, when the position of the host vehicle is not distinguished, the code M0 is representatively used.

When starting the vehicle stop control program P2, the CPU 101 determines whether stopping of the host vehicle M0 is a stop by braking support as described above (step S100). In a case where it is determined that stopping of the host vehicle M0 is not a stop by braking support (step S100: NO), the CPU 101 ends this processing routine. Even in a case where stopping is not by the braking support, for example, in a case where the host vehicle M0 is located on an uphill or downhill, the braking state may be maintained for a certain period of time as one mode of driver support.

In a case where it is determined that stopping of the host vehicle M0 is a stop by braking support (step S100: YES), the CPU 101 executes stop maintenance (step S102). In other words, independent of the operation of the brake pedal by the driver, the CPU 101 starts a process for maintaining the brake fluid pressure applied to the braking device 502 via the braking support actuator 30 for a predetermined specified period. The CPU 101 determines whether the host vehicle M0 is in a recommended stop environment (step S104). The recommended stop environment means an environment in which it is desirable to maintain the stopped state of the vehicle by continuing stop maintenance of the vehicle executed after a stop by braking support without releasing even after a predetermined period elapses. More specifically, for example, corresponds to an environment in which the host vehicle M0 has not entered the intersection IS or the host vehicle M0 has not entered a road. In addition, this also corresponds to an environment in which the host vehicle M0 is stopped after detecting a crossing vehicle M2, where it is estimated that an intersection exists in front of the vehicle. For example, the recommended stop environment corresponds to an environment such as illustrated in FIG. 4 in which the host vehicle M0a stopped by the braking support is located at a position before the intersection IS, for example, on a stop line or at a position further away from the intersection than the stop line. Alternatively, in a case of entering a roadway from off the roadway, for example, from a parking lot; the recommended stop environment corresponds to an environment in which the host vehicle is stopped by braking support before entering the roadway. In addition, the recommended stop environment corresponds to an environment in which the door is opened without the side brake being operated or the position of the transmission being shifted to neutral or the parking position after the vehicle is stopped by the braking support. In this case, after a predetermined period elapses after the driver gets out of the host vehicle, the vehicle starts moving without the driver in the vehicle. On the other hand, an environment that does not correspond to the recommended stop environment corresponds, for example, to an environment in which the host vehicle M0b that is stopped by braking support in the intersection IS is located as illustrated in FIG. 4. Alternatively, corresponds to an environment in which the host vehicle is stopped by braking support on a road on which there is no traffic signal SG; for example, a dedicated motorway or a highway. It should be noted that not entering an intersection IS, just before an intersection, and just before entering a roadway mean positions where the vehicle will not come in contact with or collide with another vehicle traveling on a lane crossing the lane of the host vehicle.

In a case where it is determined that the host vehicle M0 is in a recommended stop environment (step S104: YES), the CPU 101 sets a period of co instead of the predetermined period α as the stop maintenance determination period Tmax (step S106). In an environment where it is desirable to maintain the stopped state of the host vehicle described above, when the stopped state of the host vehicle by braking support is released according to time and not depending on the intention of the driver, there is a possibility that the driver is not operating the brake pedal. As a result, the host vehicle may start to move with the release of the stopped state of the vehicle, and there is a risk that the vehicle will collide with another vehicle due to entering an intersection IS or due to entering into an intersecting road; and in a case where the door is opened, there is a possibility that the host vehicle will start moving without the driver being in the vehicle. Therefore, in order not to execute a release of stop maintenance of the vehicle according to the passage of time, the stop maintenance determination period Tmax is set to ∞ (infinity). Note that a finite time such as 10 min or 30 min may be set instead of ∞.

In a case where it is determined that the host vehicle M0 is not in a recommended stop environment (step S104: NO), the CPU 101 sets a predetermined period α as the stop maintenance determination period Tmax (step S108). As the predetermined period α, for example, a period of 2 sec to 5 sec may be set. In an environment that does not correspond to the recommended stop environment described above, or in other words, in an environment in which it is not desirable to maintain the stopped state of the vehicle; in a case where the vehicle continues to be maintained in the stopped state after the host vehicle is stopped by braking support, there is a possibility, on the contrary, that there will be contact or collision with another vehicle that is following or with a crossing vehicle. Therefore, in order to execute a release of stop maintenance of the vehicle due to the passage of time, a predetermined period in seconds is set as the stop maintenance determination period Tmax.

The CPU 101 determines whether a braking maintenance period BHT has become equal to or longer than the set stop maintenance determination period Tmax, or whether an operation by the driver has been detected (step S110). Here, the braking maintenance period BHT is an elapsed time from when the host vehicle is stopped by braking support. In the present embodiment, when the vehicle speed detected by the speed sensor 24 is 0 km/h, it is determined that the host vehicle is in a stopped state. In a case where it is determined that none of the conditions is satisfied, the CPU 101 waits (step S110: NO).

Figure 5:
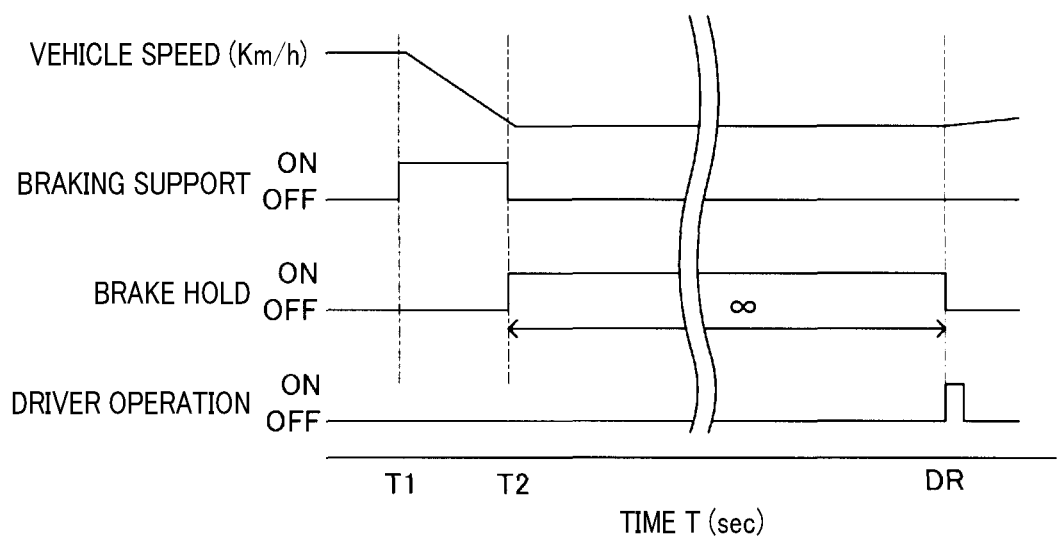
FIG. 5 is a time chart illustrating the change over time of vehicle speed, braking support, brake hold, and driver operation in a case where it is determined that it is desirable to maintain the host vehicle in a stopped state beyond a predetermined period of time in a first embodiment.
Figure 6:
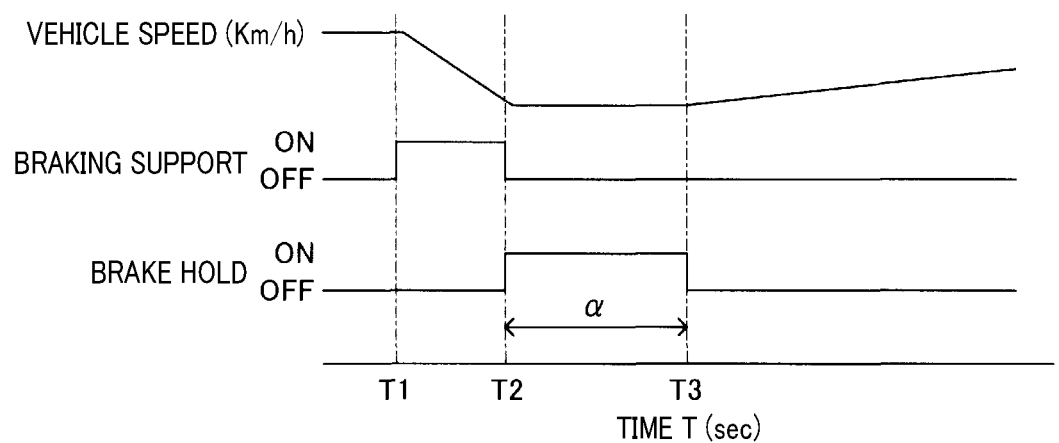
FIG. 6 is a time chart illustrating the change over time of vehicle speed, braking support, and brake hold in a case where it is determined that it is not desirable to maintain the host vehicle in a stopped state beyond a predetermined period of time in a first embodiment.

In a case where it is determined that any one of the conditions is satisfied (step S110: YES), the CPU 101 releases the stop maintenance state (step S112), and ends this processing routine. Changes over time in vehicle speed V (km/h), braking support (ON/OFF), brake hold (ON/OFF), and driver operation (ON/OFF) of driver operation during execution of this processing flow will be described. As illustrated in FIG. 5 and FIG. 6, when braking support is turned ON (T1), the vehicle speed V starts to decrease with a slight delay, and when the vehicle speed V=0 km/h, or in other words, when the host vehicle stops, braking support is turned OFF (T2). At the same time as when the braking support is turned OFF, a brake hold, or in other words, stop state maintenance is turned ON (T2). As illustrated in FIG. 5, in a case where it is determined that the host vehicle M0 exists in a recommended stop environment, or in other words, when the stop maintenance determination period Tmax=∞, the brake hold after braking support is continued until the time DR when an operation by the driver is inputted. Operation by a driver includes, for example, stepping on an accelerator pedal, stepping on a brake pedal, and turning OFF a main switch for turning ON/OFF braking support. On the other hand, as illustrated in FIG. 6, in a case where it is determined that the host vehicle M0 is not in a recommended stop environment, or in other words, when the stop maintenance determination period Tmax is set to Tmax=α, the brake hold after braking support is released when the period α has elapsed (T3).

With the braking support device 10 and the braking support control method according to the first embodiment described above, in a case where it is determined that it is desirable to maintain the vehicle in a stopped state for more than a predetermined period after the vehicle is stopped by braking support according to the detected state of the surroundings of the host vehicle, the stopped state of the host vehicle is not released after a predetermined period has elapsed, and the stopped state of the host vehicle is not released until operation by the driver is detected. Therefore, it is possible to execute maintenance of the vehicle stop after the vehicle is stopped by braking support according to the surrounding state of the host vehicle. In other words, in a state where there is a possibility of contact or collision with another vehicle due to the movement of the host vehicle caused by releasing the stopped state of the host vehicle after a predetermined period has elapsed, the stopped state of the host vehicle is maintained, so contact or collision with another vehicle due to movement of the host vehicle may be avoided or reduced.

With the braking support device 10 according to the first embodiment, in a case where it is determined that it is not desirable to maintain the host vehicle in a stopped state beyond a predetermined period after the host vehicle has been stopped by braking support in accordance to the detected surrounding conditions of the host vehicle, the stopped state of the host vehicle is released after a predetermined period has elapsed. Therefore, release of maintenance of the vehicle stop after the vehicle is stopped by braking support may be executed in accordance with the state of the surroundings of the host vehicle. In other words, in a state where there is a possibility of contact or collision with another vehicle due to maintaining the stopped state of the host vehicle after a predetermined period has elapsed, the stopped state of the host vehicle is released, so contact or collision with another vehicle due to movement of the host vehicle may be avoided or reduced.

Modifications (1) In the first embodiment described above, in a case where it is determined that it is desirable to maintain the host vehicle in a stopped state beyond a predetermined period, the stopped state of the vehicle M0a is released after waiting for an operation by the driver; however, the driver may be notified on an instrument panel or on a head-up display that the stopped state is being maintained. In this case, it is possible to prompt the driver to pay attention to the fact that the host vehicle is being maintained in the stopped state due to a judgment on the vehicle side. Moreover, in addition to that notification, the driver may also be notified that the stopped state of the host vehicle is being maintained until operation of the accelerator or the brake is performed. In this case, the driver may be informed of what kind of operation will release the stopped state of the host vehicle.

(2) In the first embodiment, the attributes of the oncoming vehicles M1 and M2 are determined using the detection signals or image data from the millimeter-wave radars 21, 21s, the monocular camera 22, or LIDAR and a stereo camera as the target object detecting unit. On the other hand, the attributes of the oncoming vehicles M1 and M2 may also be determined using data, for example, the steering angle, the accelerator opening, and the brake operation amount related to the behavior of other vehicles acquired via an inter-vehicle communication system.

(3) In the first embodiment, a braking support control unit and a vehicle stop control unit are achieved by software by the CPU 101 executing a braking support control program P1 and a vehicle stop control program P2; however, may also be achieved by hardware by a pre-programmed integrated circuit or a discrete circuit.

As described above, the technique according to the present disclosure has been described based on embodiments and the modifications; however, the embodiments of the present invention described above are intended to facilitate understanding of the present disclosure, and do not limit the present disclosure. The technique according to present disclosure may be modified and improved without departing from the spirit and scope of the claims, and includes equivalents thereof. For example, in order to solve all or part of the problems described above, or in order to achieve all or part of the effects described above, the embodiments corresponding to the technical features of each of the forms described in the Summary, and the technical features of the modifications may replaced or combined as appropriate. Moreover, technical features may be appropriately omitted, unless described as being essential in the present description. For example, a vehicle braking support device according to the first form described above is taken to be an Application Example 1.

Application Example 2

The vehicle braking support device according to Application Example 1, wherein in a case where the detected state indicates that the host vehicle has not entered an intersection, that the host vehicle has not entered a road, or that a vehicle is crossing in front of the host vehicle is detected, the vehicle stop control unit determines that it is desirable to maintain the stopped state of the host vehicle beyond the predetermined period.

Application Example 3

The vehicle braking support device according to Application Example 2, wherein in a case where it is detected that a door of the host vehicle is open, the vehicle stop control unit further determines that it is desirable to maintain the stopped state of the host vehicle beyond the predetermined period.

Application Example 4

The vehicle braking support device according to any one of Application Examples 1 to 3, wherein in a case where the detected state indicates that the host vehicle is in the intersection or that the host vehicle is on the road where a traffic signal is not arranged, the vehicle stop control unit does not determine that it is desirable to maintain the stopped state of the host vehicle beyond the predetermined period, and releases the stopped state of the host vehicle after the predetermined period has elapsed.

Application Example 5

The vehicle braking support device according to any one of Application Examples 1 to 4, further including detection units (21, 21s, 22) for detecting a state around the host vehicle.

CONCLUSION

In the foregoing embodiments, vehicle braking support and braking support control method have been described.

According to the present disclosure, a first aspect provides a vehicle braking support device. A braking support device for a vehicle according to a first aspect includes a braking support control unit for executing braking support by a braking device according to a detected state of surroundings of a detected host vehicle; and a vehicle stop control unit for maintaining a stopped state of a host vehicle after the host vehicle is stopped by the braking support control unit, and for releasing the stopped state of the host vehicle after a predetermined period has elapsed; wherein in a case where by using the detected state it is determined that it is desirable to maintain the stopped state of the host vehicle beyond the predetermined period, the vehicle stop control unit does not release the stopped state of the host vehicle until an operation by a driver is detected.

With the vehicle braking support device according to the first aspect, it is possible to execute the maintenance of the vehicle stop or the release of the maintenance after the vehicle is stopped by the braking support according to the surrounding state of the host vehicle.

A second aspect provides a vehicle braking support control method. The vehicle braking support control method according to the second aspect includes steps of: detecting a state surroundings a host vehicle; executing braking support by a braking device according to the detected state; and in a case where, when maintaining a stopped state of a host vehicle after the host vehicle is stopped by the braking support, and releasing the stopped state of the host vehicle after a predetermined period has elapsed, it is determined by using the detected state that it is desirable to maintain the stopped state of the host vehicle beyond the predetermined period, not releasing the stopped state of the host vehicle until an operation by a driver is detected.

With the vehicle braking support control method according to the second aspect, it is possible to execute the maintenance of the vehicle stop or the release of the maintenance after the vehicle is stopped by the braking support according to the surrounding state of the host vehicle. Note that the technique according to the present disclosure may also be achieved as a vehicle braking support program or a computer-readable recording medium that stores the program.

What is claimed is:
1. A vehicle braking support device comprising:
  a braking support control unit for executing braking support by a braking device according to a detected state of surroundings of a detected host vehicle; and
  a vehicle stop control unit for maintaining a stopped state of a host vehicle after the host vehicle is stopped by the braking support control unit, and for releasing the stopped state of the host vehicle after a predetermined period has elapsed, wherein
  in a case where, by using the detected state it is determined that it is desirable to maintain the stopped state of the host vehicle beyond the predetermined period, the vehicle stop control unit does not release the stopped state of the host vehicle until an operation by a driver is detected, and in a case where the detected state indicates that the host vehicle is in an intersection or that the host vehicle is on a road where a traffic signal is not arranged, the vehicle stop control unit does not determine that it is desirable to maintain the stopped state of the host vehicle beyond the predetermined period, and releases the stopped state of the host vehicle after the predetermined period has elapsed, the vehicle braking support device further comprising a recommended stop environment determination unit for determining whether the host vehicle is in a recommended stop environment or a non-recommended stop environment, wherein for a state in which the host vehicle is in the non-recommended stop environment, the vehicle stop control unit releases the stopped state after the predetermined period has elapsed.

2. The vehicle braking support device according to claim 1, wherein the vehicle stop control unit, in a case where the detected state indicates that the host vehicle has not entered the intersection, that the host vehicle has not entered the road, or that a vehicle is crossing in front of the host vehicle is detected, determines that it is desirable to maintain the stopped state of the host vehicle beyond the predetermined period.

3. The vehicle braking support device according to claim 2, wherein the vehicle stop control unit, in a case where it is detected that a door of the host vehicle is open, further determines that it is desirable to maintain the stopped state of the host vehicle beyond the predetermined period.

4. The vehicle braking support device according to claim 1, further comprising detection units for detecting a state surrounding the host vehicle.

5. The vehicle braking support device according to claim 1, wherein the non-recommended stop environment comprises an environment in which a risk of a collision between the host vehicle and another vehicle exists due to maintaining of the stopped state, the environment including a state in which the host vehicle is stopped in an intersection on a road on which there is no traffic sign.

6. A vehicle braking support control method comprising:

detecting a state of surroundings of a host vehicle;

executing braking support by a braking device according to the detected state;

in a case where, when maintaining a stopped state of a host vehicle after the host vehicle is stopped by the braking support, and before releasing the stopped state of the host vehicle after a predetermined period has elapsed, it is determined by using the detected state that it is desirable to maintain the stopped state of the host vehicle beyond the predetermined period, not releasing the stopped state of the host vehicle until an operation by a driver is detected; and in a case where the detected state indicates that the host vehicle is in an intersection or that the host vehicle is on a road where a traffic signal is not arranged, not determining that it is desirable to maintain the stopped state of the host vehicle beyond the predetermined period, and releasing the stopped state of the host vehicle after the predetermined period has elapsed, the vehicle braking support control method further comprising determining whether the host vehicle is in a recommended stop environment or a non-recommended stop environment, wherein for a state in which the host vehicle is determined to be in the non-recommended stop environment, the stopped state of the host vehicle is released after the predetermined period has elapsed.

7. The vehicle braking support control method according to claim 6, wherein the non-recommended stop environment comprises an environment in which a risk of a collision between the host vehicle and another vehicle exists due to maintaining of the stopped state, the environment including a state in which the host vehicle is stopped in an intersection on a road on which there is no traffic sign.

8. A vehicle braking support device for executing braking support via a braking device installed on a host vehicle, the vehicle braking support device comprising:

a processor;

a non-transitory computer-readable storage medium; and a set of computer-executable instructions stored on the non-transitory computer-readable storage medium that cause the processor to:

execute braking support via the braking device according to a detected state of surroundings of the host vehicle;

maintain a stopped state of the host vehicle after the host vehicle is stopped by execution of the braking support, and release the stopped state of the host vehicle after a predetermined period has elapsed; and determine whether the host vehicle exists within a recommended stop environment or a non-recommended stop environment based on the detected state of the surroundings of the host vehicle, the host vehicle being determined to existing in the non-recommended stop environment for a state in which the detected state of the surroundings of the host vehicle comprise at least one of:

an environment in which the host vehicle is stopped in an intersection;

an environment in which the host vehicle is stopped on a road on which there is no traffic signal; and an environment in which a risk of a collision between the host vehicle and another vehicle exists due to maintaining of the stopped state, wherein for a state in which the host vehicle is determined to be in the recommended stop environment beyond the predetermined period, the stopped state is maintained until an operation by a driver is detected, and for a state in which the host vehicle is determined to be in the non-recommended stop environment, the stopped state is released after the predetermined period has elapsed.

* * * * *